United States Patent [19]
Smith et al.

[11] Patent Number: 4,914,514
[45] Date of Patent: Apr. 3, 1990

[54] METHOD AND APPARATUS FOR GAUGING WELL SCREENS

[75] Inventors: Jeffrey P. Smith, Conroe; Michael T. Giroux, Huntsville, both of Tex.

[73] Assignee: Baker Hughes Incorporated, Houston, Tex.

[21] Appl. No.: 340,252

[22] Filed: Apr. 19, 1989

[51] Int. Cl.$^4$ .............................................. H04N 7/18
[52] U.S. Cl. ...................................... 358/107; 29/407; 29/163.7
[58] Field of Search ........................... 73/865.8, 865.9; 358/101, 106, 107, 109; 29/163.7, 407

[56] References Cited

U.S. PATENT DOCUMENTS

| | | | |
|---|---|---|---|
| 4,021,840 | 5/1977 | Ellsworth et al. | 358/101 |
| 4,696,047 | 9/1987 | Christian et al. | 358/106 |
| 4,787,715 | 11/1988 | Ahmed et al. | 358/101 |
| 4,818,403 | 4/1989 | Nagaoka | 29/163.7 |

OTHER PUBLICATIONS

Wuestenhagen, "Photomask Inspection System", IBM Technical Disclosure Bulletin, vol. 15, No. 10, Mar. 1973.

Primary Examiner—Robert R. Raevis
Attorney, Agent, or Firm—Hubbard, Thurman, Turner & Tucker

[57] ABSTRACT

A method and apparatus for gauging the separation of successive turns of a wire helically wound on a fluid pervious, cylindrical body to form a wire screen for a subterranean well comprising the scanning of two adjacent wire turns after they are formed on the rotating cylindrical body with a video camera having a magnifying lens, projecting the resultant enlarged image of two adjacent wire turns on a video screen and simultaneously projecting on the same video screen parallel visible lines alignable with the amplified space between the two wire images, with the spacing of said parallel lines calibrated to represent a prescribed maximum and minimum tolerance dimension for the magnified spacing of the wire turns.

9 Claims, 2 Drawing Sheets

METHOD AND APPARATUS FOR GAUGING WELL SCREENS

BACKGROUND OF THE INVENTION

1. Field of the Invention

The invention relates to a method and apparatus for gauging the spacings between successive turns of a wire helically wound on a fluid pervious, generally cylindrical body to form a wire screen for use in subterranean wells.

2. Summary of the Prior Art

Wire screens have long been employed in subterranean wells at the bottom of a production tubing string and in communication with a fluid producing formation. Such screens embody a wire helically wound around and welded to a generally cylindrical, fluid pervious body, such as a plurality of peripherally spaced rods or a cylindrical tube having a plurality of axially and angularly spaced radial perforations therein. The spacing between adjacent turns of the helical wire determines the size of particles that are permitted to pass through the screen and into the tubing string. It is very critical to the operation of all equipment disposed uphole from the screen and extending to the pipe line to eliminate particles of significant size from the flow of well fluids. It is equally important that the successive helical turns not be spaced so closely together as to constitute a barrier to the full production flow of the particular formation.

In recent years, well operators have imposed increasingly stringent requirements on the manufacturers of helically wound wire screens to adhere to prescribed spacings between all adjacent turns of the screen. Such requirements have resulted in the necessity of manually gauging both the minimum and maximum spacing of all the turns of a wire screen and, since the wire employed is normally of a width or diameter approximating 0.090 inches and the screens are ten feet or more in length, this involves a very time consuming laborious job which is never completely accurate because the entire circumference of each turn spacing is very difficult to manually gauge.

There is, therefore, a definitive need for a method and apparatus for gauging both the maximum and minimum spacing of adjacent turns of a helically wound wire screen for use in subterranean wells wherein the gauging is effectively accomplished between all adjacent turns and around the entire periphery of the screen. Such method and apparatus has not heretofore been available in the prior art.

SUMMARY OF THE INVENTION

Wire screens for subterranean wells are commonly formed on a large lathe which effects the simultaneous rotation and axial translation of a generally cylindrical, fluid pervious body upon which a continuous length of wire is to be continuously wound. In a preferred embodiment, the fluid pervious, generally cylindrical body is defined by a large number of peripherally spaced, elongated rods. The wire is fed from a coil and welded to each of the rods by a grooved wheel. Since the resulting generally cylindrical body is slowly moved axially as it rotates, the wire is wrapped in a helical pattern, hopefully with equal spacing between all successive turns.

In accordance with this invention, a video camera having a magnifying lens is fixedly mounted on the winding machine and the field of vision of the video camera is centered upon at least two adjacent turns of the wound wire. The amount of magnification is selected so as to provide a readily visible image of the two adjacent turns of wire and the space existing therebetween on a video screen which is located adjacent to an operator's station. Concurrently, preferably two pair of parallel lines are imposed on the same video screen by a well known apparatus known in the art as a cross hair generator. The spacing of these parallel lines is capable of adjustment by turning a knob on the cross hair generator.

The apparatus is calibrated by first focusing the camera on a calibrated pin gauge having an outside diameter (OD) corresponding to the maximum permissible dimension and choosing a desired degree of amplification of the resulting video image. The spacing of the parallel lines is then adjusted to correspond to the OD of the pin gauge produced on the video screen. Thus, any adjacent turns having a spacing greater than the width of the parallel lines is automatically known to be out of tolerance and corrective steps can be taken to overcome this condition. The gauging of the minimum spacing between adjacent wire turns can be accomplished in a similar manner by first positioning a pin gauge calibrated to the prescribed minimum spacing and then producing an amplified image of the pin gauge on the video screen. The parallel lines are then adjusted to conform to the OD of the pin gauge appearing on the video screen. Thus any subsequent spacing projected on the screen which is less than the width of this second pair of parallel lines is obviously out of tolerance.

Dual cross hair generators are preferably employed which will concurrently project two pairs of parallel lines on the video screen. Thus, one pair of lines can be calibrated to correspond to the maximum amplified spacing dimension of adjacent turns and the other pair of parallel lines can be adjusted to correspond to the magnified minimum permissible spacing of the adjacent turns. Such dual cross hair generators have the capability of producing one set of parallel lines as solid lines and another set as dash lines, so that it is readily apparent to the operator which lines represents the maximum or the minimum tolerance spacing.

A further advantage of the method and apparatus of this invention is that the signals applied to the video screen may be concurrently recorded on a VCR (video cassette recorder) and thus a permanent record may be obtained of the spacing between all turns of a helically wound wire screen around the entire circumference of the screen.

Further advantages of the invention will be readily apparent to those skilled in the art from the following detailed description, taken in conjunction with the annexed sheets of drawings on which is shown a preferred embodiment of the invention.

DESCRIPTION OF PREFERRED EMBODIMENT

Figure 1:
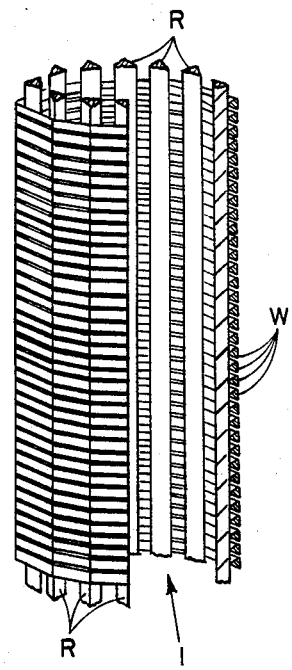
FIG. 1 is a vertical, quarter sectional view of a portion of a wire screen for subterranean wells.

As indicated above, the method and apparatus of this invention finds particular utility in gauging the spacing of successive turns of a wire helically wound around a fluid pervious, generally cylindrical body element to provide a screen for use in subterranean wells. As schematically illustrated in FIG. 1, such wire W may be wound around a body comprising a plurality of peripherally spaced, longitudinally extending rod elements R to which the wire W is welded to form a polygonal construction approaching a cylindrical configuration wherein elongated slots are provided between the adjacent rods along the entire length of the cylindrical body. The rods R are preferably of triangular crosssection with the vertex disposed outwardly. Similarly, the wire W is of triangular crosssection with a vertex disposed inwardly to contact the vertices of the rods R. This minimum contact area facilitates the rapid welding of the contacting vertices by an applicating wheels 20 as will be described. The method and apparatus of this invention is independent of the type of generally cylindrical body upon which the wire is helically wrapped.

Figure 2:
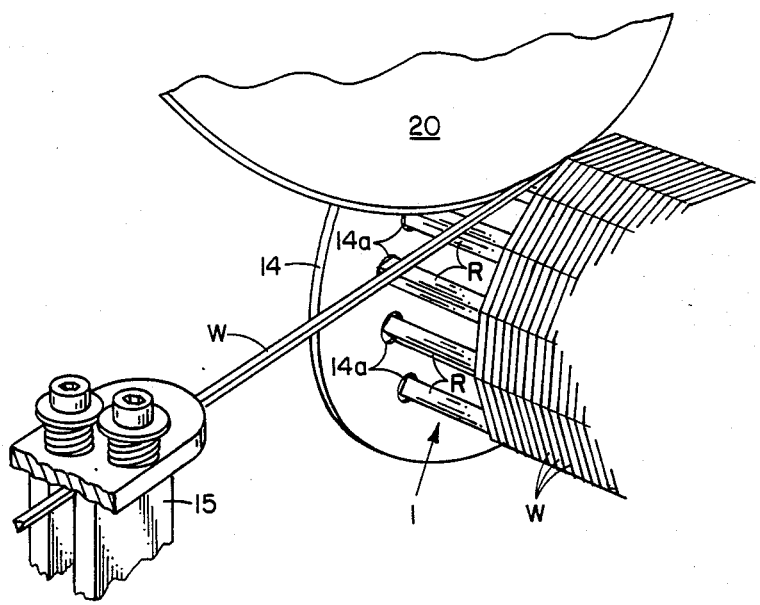
FIG. 2 is a schematic perspective view of an apparatus for winding and welding a wire screen with the applicating wheel omitted for clarity of illustration.
Figure 3:
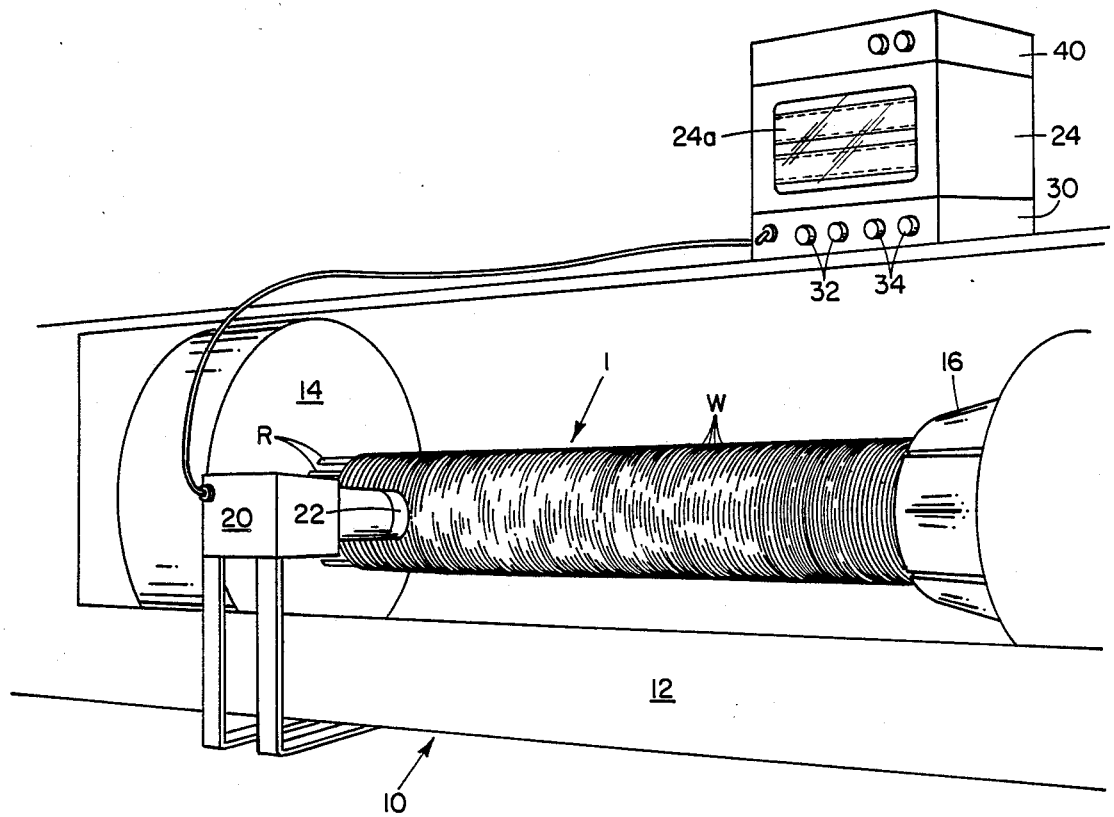
FIG. 3 is a schematic perspective view of gauging apparatus embodying this invention with the application wheel omitted for clarity of illustration.

Referring now to FIGS. 2 and 3, there is schematically shown a conventional apparatus for helically wrapping and welding a wire W around a generally cylindrical body 1 defined by a plurality of rods R. As shown in FIG. 3, such apparatus is generally similar to a lathe 10 having an elongated bed 12 with the headstock 14 of the lathe rotating the cylindrical body 1 and the tailstock 16 of the lathe being axially movable along bed 12 relative to the headstock 14 and in timed relation to the rotation thereof, and has conventional means thereon for grasping the wire wound body 1 and pulling it through the headstock 14. Headstock 14 is provided with a plurality of peripherally spaced apertures 14a to support rods R which define the fluid pervious cylindrical body 1. The wire W is provided from a storage reel and passes through a tension guide 15. Wire W is applied and welded to the generally cylindrical body 1 by a grooved applicating wheel 20 (FIG. 2) which rotates in timed relationship to the rotation of the body 1 and is axially fixed relative to the headstock 14.

Thus the wire W is helically applied to the cylindrical body 1 and the spacing of successive turns of wire W is determined primarily by the relationship of the linear movement of the tailstock 16 to the rotational movement imparted to the body 1 by the headstock 14. While the resulting spacing between adjacent wire turns should be uniform, it is well recognized that very minor kinks or bends in the wire W or rods R can effect a variation in the spacing of adjacent turns. For this reason, the gauging of the spacings of all of the turns of the wire is a requirement of oil field operators.

In accordance with this invention, a video camera 20 having an amplifying lens 22 is fixedly mounted adjacent the lathe bed 12 and adjusted so that the field of vision scanned by the lens includes at least two adjacent turns of the helically wrapped wire W. If lighting conditions are not adequate, a conventional spotlight-type illuminator (not shown) can be provided to illuminate that portion of the helically wound wire which the video camera is scanning. Alternatively, a conventional flexible fiber optic illuminator can be employed to illuminate the viewing field of camera 20. While any conventional video camera with a magnifying lens may be employed, a video camera sold under the trademark "PANASONIC" as Model No. WV - CD - 110 is preferably employed. The video camera develops in conventional fashion an electronic signal which is applied to a video screen 24a mounted in a television unit 24 which is also fixedly mounted relative to the lathe bed 12 at a position wherein it is readily observable by the operator. Such television unit may constituted any one of a large number of units available on the market.

Adjacent to the television unit 24, a cross hair generator 30 and a VCR 40 are also mounted. As illustrated in the drawings, the cross hair generator 30, the television unit 24, and the VCR 40 may be mounted in vertically stacked relationship. The cross hair generator 30 is a conventional device capable of producing one or more pairs of parallel visible lines on the video screen 24a and having means, such as adjusting knobs 32 and 34 for effecting adjustment of the spacing and vertical positioning of such pairs of lines. It is preferred to employ a dual cross hair generator manufactured and sold by the RAM CORPORATION of Huntington Beach, California. The VCR unit 40 may be any conventional VCR unit capable of storing the electrical signals applied to the video screen 24a on a cassette tape.

The operation of the aforedescribed apparatus will be readily apparent to those skilled in the art. Due to the magnifying properties of the magnifying lens 22 of television camera 20, the resulting magnified image of two adjacent turns of wire W appears on the video screen 24a as two bright areas separated by a dark spacing which constitutes a magnification of the actual spacing between successive turns of the helically applied wire.

To calibrate the unit, a spacing corresponding to the maximum spacing tolerance is produced on the helically formed wire using the calibrated pin gauge while the headstock is stationary. The one set of parallel visible lines produced on the video screen 24a by the dual cross hair generator 30 is then adjusted to correspond to the maximum spacing. The process is then repeated to produce a second set of visible parallel lines on the video screen corresponding exactly to the magnified minimum permissible spacing. Such spacing lines are, of course, vertically positioned so as to lie in concentric relationship to the horizontal center line of the magnified spacing image produced on the video screen 24a.

The wire applicating operation is then initiated and continuous images of at least two of the wires, and therefore the spacing between such wires successively appear on the video screen 24a. Such images permit the alignment of the magnified actual spacing of the wires to be juxtaposed between the two parallel sets of visible lines. So long as the actual spacing falls between the minimum and maximum parallel lines, the operator is assured that the spacing is within tolerance. If the magnified visual appearance of the spacing lies outside the set of parallel lines corresponding to the maximum permissible dimension, the operator knows that that portion of the screen is not acceptable and takes appropriate remedial action. Similarly, if the magnified actual image of the spacing between the successive adjacent turns of wire is less than the distance between the two lines representing the minimum tolerance dimensions, this informs the operator that the spacing is too close.

Figure 4:
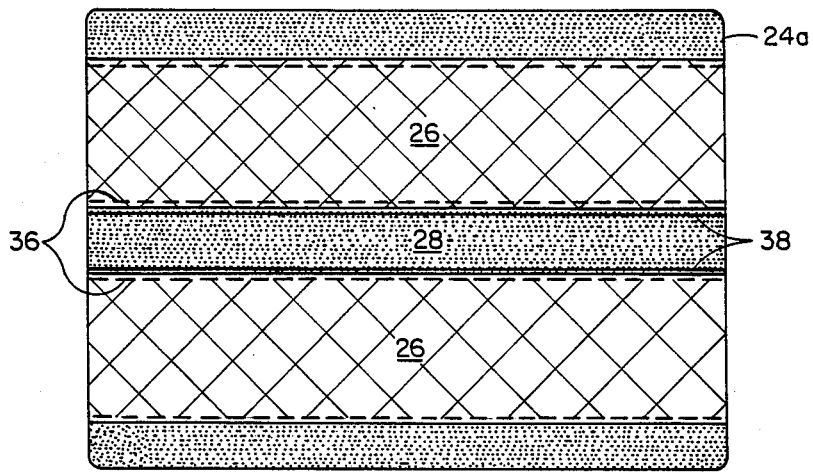
FIG. 4 is an elevational view of the magnified images produced on the video screen.

The dual cross hair generator mentioned above has the capability of producing one set of visible parallel lines in solid form and the other set in dash form. Thus, as shown in FIG. 4, the indications on the video screen 24a will comprise two parallel wide bright areas 26

(shown by crosshatching) representing the magnified images of the actual wire turns. The dotted lines 36 represent the magnified maximum tolerance dimension, while the solid lines 38 represent the minimum amplified tolerance dimensions produced by the dual cross hair generator 30. So long as the magnified actual spacing 28 (shown by dots) between the wires falls between these two sets of parallel lines, the operator is assured that the successive spacings between the adjacent turns of the wire screen falls within the permitted dimensional limits.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. The method of gauging the separation of successive turns of a wire helically wound on a fluid pervious, generally cylindrical body to form a wire screen for use in subterranean wells, comprising the steps of:
   rotating the cylindrical body about its longitudinal axis;
   scanning a field of vision including at least two adjacent wire turns with a video camera having a magnifying lens;
   projecting the resultant enlarged image of two adjacent wire turns on a video camera;
   simultaneously projecting on the same video screen two pair of parallel visible lines alignable with the space between the two adjacent wire images on said screen; and
   calibrating the spacing of said parallel lines to represent prescribed maximum and minimum tolerance dimension for the magnified video spacing of the wire turns.

2. The method of claim 1 wherein all steps except the step of calibrating are performed concurrently with the winding of the wire on the generally cylindrical body.

3. The method of gauging the separation of successive turns of a wire helically wound on a fluid pervious, generally cylindrical body to form a wire screen for use in subterranean wells, comprising the steps of:
   rotating the cylindrical body about its longitudinal axis;
   scanning a field of vision including at least two adjacent wire turns with a video camera having a magnifying lens;
   projecting the resultant enlarged image of two adjacent wire turns on a video screen;
   simultaneously projecting on the same video screen a first pair of parallel visible lines alignable with the space between the two adjacent wire turn images and calibrated to represent the magnified maximum spacing desired between all wire turns; and
   simultaneously projecting on the same video screen a second pair of parallel visible lines alignable with the space between the two adjacent wire images and calibrated to represent the magnified minimum spacing desired between all wire turns.

4. The method of claims 1 or 3 further comprising the step of video recording signals corresponding to all video images produced on the video screen.

5. The method of claim 3 wherein all steps are performed concurrently with the winding of the wire on the generally cylindrical body.

6. Apparatus for forming and gauging a wire screen for a subterranean well comprising:
   means for rotating a fluid pervious, generally cylindrical body about its longitudinal axis;
   means for winding and welding a continuous length of wire helically around the rotating cylindrical body to produce a desired constant spacing between successive wire turns;
   a video camera having a magnifying lens positioned to successively observe at least two adjacent turns of wire as successive turns are formed on said cylindrical body;
   a video screen operatively connected to said video camera to produce enlarged images of each successive pair of wire turns and the axial spacing therebetween;
   cross hair signal generator means operatively connected to said video screen for producing two pair of parallel visible lines on said video screen alignable with the video images of the spacings between said successive pairs of wire turns; and
   means for adjusting the spacing of said pairs of parallel visible lines to correspond exactly to the magnified maximum and minimum spacing desired for said adjacent turns of wire.

7. Apparatus for forming and gauging a wire screen for a subterranean well comprising:
   means for rotating a fluid pervious generally cylindrical body about its longitudinal axis;
   means for winding and welding a continuous length of wire helically around the rotating cylindrical body to produce a desired constant spacing between successive wire turns;
   a video camera having a magnifying lens positioned to successively observe at least two adjacent turns of wire as successive wire turns are formed on said cylindrical body;
   a video screen operatively connected to said video camera to produce enlarged images of each successive pair of wire turns and the axial spacing therebetween;
   a dual cross hair signal generator operatively connected to said video screen for producing two pairs of visible lines on said video screen alignable with the video images of the spacings between said successive pairs of wire turns;
   means for adjusting the spacing of one pair of said parallel visible lines to correspond exactly to the magnified maximum spacing desired for said adjacent turns of wire; and
   means for adjusting the spacing between said other pair of visible lines to correspond exactly to the magnified minimum spacing desired for said adjacent turns of wire.

8. The apparatus of claims 6 or 7 further comprising a means for continuously recording the video signals applied to said video screen.

9. The method of gauging the separation of successive turns of a wire helically wound on a fluid pervious, generally cylindrical body to form a wire screen for use in subterranean wells, comprising the steps of:
   rotating the cylindrical body about its longitudinal axis;

scanning a field of vision including at least two adjacent wire turns with a video camera;

projecting the resultant image from said video camera of two adjacent wire turns on a receiver;

simultaneously projecting on the same receiver means alignable with the space between the two adjacent wire images on said receiver; and calibrating the alignable means to represent prescribed maximum and minimum tolerance dimensions for the spacing of the wire turns.

* * * * *